United States Patent
Nagamoto (10) Patent No.: US 9,396,832 B2
(45) Date of Patent: Jul. 19, 2016

(54) ELECTROCONDUCTIVE PASTE FOR BONDING METAL TERMINAL, ELECTRONIC COMPONENT WITH METAL TERMINAL, AND METHOD FOR MANUFACTURING SAME

(71) Applicant: MURATA MANUFACTURING CO., LTD., Nagaokakyo-shi, Kyoto-Fu (JP)

(72) Inventor: Toshiki Nagamoto, Nagaokakyo (JP)

(73) Assignee: MURATA MANUFACUTRING CO., LTD., Nagaokakyo-Shi, Kyoto-Fu (JP)

( * ) Notice: Subject to any disclaimer, the term of this patent is extended or adjusted under 35 U.S.C. 154(b) by 9 days.

(21) Appl. No.: 14/331,518

(22) Filed: Jul. 15, 2014

(65) Prior Publication Data
US 2014/0329105 A1 Nov. 6, 2014

Related U.S. Application Data

(63) Continuation of application No. PCT/JP2013/050386, filed on Jan. 11, 2013.

(30) Foreign Application Priority Data

Jan. 31, 2012 (JP) ................. 2012-017874

(51) Int. Cl.
H01B 1/02 (2006.01)
H01B 1/22 (2006.01)
H01B 1/16 (2006.01)
H01G 4/30 (2006.01)
H01G 4/232 (2006.01)
H01B 13/00 (2006.01)
H01R 43/02 (2006.01)

(52) U.S. Cl.
CPC ............. *H01B 1/16* (2013.01); *H01B 13/0016* (2013.01); *H01B 13/0026* (2013.01); *H01G 4/2325* (2013.01); *H01G 4/30* (2013.01); *H01R 43/02* (2013.01); *Y10T 428/12111* (2015.01)

(58) Field of Classification Search
CPC ............... H01B 1/16; H01B 1/22; H01G 4/30
USPC .......................... 252/512; 361/321.2; 428/56
See application file for complete search history.

(56) References Cited

U.S. PATENT DOCUMENTS

| 4,313,900 A * | 2/1982 | Gonzales, Jr. ........ C04B 35/111 264/133 |
| 2013/0069014 A1* | 3/2013 | Lee ......................... H01B 1/22 252/512 |

FOREIGN PATENT DOCUMENTS

| JP | 4-174980 A | 6/1992 |
| JP | 2001-338830 A | 12/2001 |

(Continued)

OTHER PUBLICATIONS

PCT/JP2013/050386 Written Opinion dated Apr. 2, 2013.
PCT/JP2013/050386 ISR dated Apr. 2, 2013.

*Primary Examiner* — Khanh Tuan Nguyen
(74) *Attorney, Agent, or Firm* — Arent Fox LLP (57) ABSTRACT

An electroconductive paste that includes an inorganic filler which contains a spherical Cu powder of 3 μm or less in average particle size; a flat Cu powder of 3 or more in aspect ratio and 10 μm or more in average particle size; glass frit; and a spherical inorganic powder of 30 μm or more in average particle size, the spherical inorganic powder including an inorganic material that is not melted in a heat treatment step for baking. The spherical inorganic powder is contained in a proportion of 10 to 35 parts by volume with respect to 100 parts by volume of a mixture of the spherical Cu powder and the flat Cu powder. In addition, the proportion of the flat Cu powder falls within the range of 10 to 50% by volume with respect to the total amount of the spherical Cu powder and flat Cu powder.

17 Claims, 3 Drawing Sheets

(56) References Cited

FOREIGN PATENT DOCUMENTS

| JP | 2003-297146 A | 10/2003 | | |
| JP | 2004-172383 A | 6/2004 | | |
| JP | 4-174980 B2 | 11/2008 | | |
| JP | 2009-277652 A | 11/2009 | | |
| JP | 2011-138704 | * 7/2011 | ............... | H01B 1/22 |
| KR | 10-2012-0004122 A | 1/2012 | | |

* cited by examiner

ELECTROCONDUCTIVE PASTE FOR BONDING METAL TERMINAL, ELECTRONIC COMPONENT WITH METAL TERMINAL, AND METHOD FOR MANUFACTURING SAME

CROSS REFERENCE TO RELATED APPLICATIONS

The present application is a continuation of International application No. PCT/JP2013/050386, filed Jan. 11, 2013, which claims priority to Japanese Patent Application No. 2012-017874, filed Jan. 31, 2012, the entire contents of each of which are incorporated herein by reference.

FIELD OF THE INVENTION

The present invention relates to an electroconductive paste for bonding a metal terminal, which is used for bonding a metal terminal to an electrode such as an external electrode included in a chip-type electronic component, a method for manufacturing an electronic component with a metal terminal, which includes a step of bonding a metal terminal to an external terminal with the use of the electroconductive paste for bonding a metal terminal, and an electronic component with a metal terminal, which is manufactured by the manufacturing method.

BACKGROUND OF THE INVENTION

For example, in the case of forming external electrodes of chip-type electronic components, methods are widely used in which a paste-like electroconductive paste obtained by kneading an electroconductive constituent with glass frit, an organic vehicle, etc. is applied and baked.

Further, as such an electroconductive paste, for example, an electroconductive paste for external electrodes has been proposed which contains at least spherical and flake copper powders and glass frit, and forms an external electrode by application to a predetermined surface of a chip-type electronic component, such that the average particle sizes of the spherical and flake copper powders both fall within the range of 3 to 10 μm, and the electroconductive paste has a film density of 4.0 g/cm$^3$ or more (see Patent Document 1).

In addition, as an electroconductive paste that is used for the formation of external electrodes in a step for manufacturing a ceramic electronic component structured to have external electrodes provided on a ceramic element, an electroconductive paste has been proposed which contains: a metal powder containing, as its main constituent, a Cu powder obtained by blending a flake Cu powder that meets the requirements of 0.5 to 1.0 m$^2$/g in specific surface area, 20 to 40 μm in longest diameter B, and 0.05 to 3 μm in thickness T, and a spherical Cu powder in predetermined proportions; a glass powder; a binder; and an organic solvent (see Patent Document 2).

Furthermore, an electroconductive paste containing an inorganic powder and an organic vehicle has been proposed which is baked to form external electrodes for laminated ceramic electronic components, where the inorganic powder contains a metal powder composed of Cu or a metal powder containing Cu as its main constituent, glass frit, and a titanium oxide powder, the proportion of the glass frit is 15% by volume to 30% by volume with respect to 100% by volume of the metal powder, the proportion of the titanium oxide powder is 0.5% by volume to 6.0% by volume with respect to 100% by volume of the metal powder, and the glass frit is further 1.4 Pa·s to 3.1 Pa·s in viscosity log η at a baking temperature (see Patent Document 3).

While various types have been proposed as electroconductive pastes as described above, these electroconductive pastes are all electroconductive pastes for the formation of external electrodes for chip-type electronic components, but not intended for use in bonding metal terminals to external electrodes formed on electronic component elements (electronic component bodies).

Therefore, when these pastes are used for bonding metal terminals, it is actually difficult to achieve intended bonding characteristics such as desired bonded conditions and bonding strength.

For example, when the electroconductive pastes in Patent Documents 1 and 2 are used to bond metal terminals to external electrodes formed on end surfaces of electronic component elements, there are problems as explained below.

More specifically, for bonding metal terminals to external electrodes formed on end surfaces of electronic component elements, for example, when a method is applied in which the metal terminals are bonded to the external electrodes by baking the electroconductive paste while the metal terminals are pushed against the external electrodes with the electroconductive paste interposed therebetween, the electroconductive paste located between the metal terminals and external electrodes will be spread out to lose the ability to sufficiently ensure the amount of the electroconductive paste existing between the metal terminals and the external electrodes, thus resulting in an insufficient fixing strength of the fired metal terminals to the external electrodes, and resulting in a problem of failure to achieve any highly reliable electronic component with metal terminals.

In addition, even if a certain level of bonding force (fixing force) is achieved, because of the low amount of baked electrodes (bonding electrodes) located between the metal terminals and the external electrodes to provide the bonding force, the difference in linear coefficient of expansion between an electronic component element (for example, a ceramic body) as a base material and the metal terminal is not able to be absorbed sufficiently by the baked electrode, and there is the problem of crack generation in the baked electrode itself, the ceramic body, etc. in a thermal shock test.

In addition, even in the case of using the electroconductive paste in Patent Document 3, because of the inability to hold the electroconductive paste in a sufficient amount between metal elements and external electrodes, the difference in linear coefficient of expansion between an electronic component element (for example, a ceramic body) and the metal terminal is not able to be sufficiently absorbed by the baked electrode (bonding electrode), and there is the problem of crack generation in the baked electrode itself, the ceramic body, etc. in a thermal shock test.

Patent Document 1: Japanese Patent Application Laid-Open No. 2001-338830
Patent Document 2: Japanese Patent Application Laid-Open No. 2004-172383
Patent Document 3: Japanese Patent Application Laid-Open No. 2003-297146

SUMMARY OF THE INVENTION

The present invention is intended to solve the problems mentioned above, and an object of the present invention is to provide an electroconductive paste for bonding a metal terminal, which is able to ensure that a metal terminal is bonded to an electrode provided on an electronic component element or the like, a method for manufacturing an electronic component with a metal terminal with the use of the electroconductive paste for bonding a metal terminal, and a highly reliable electronic component with a metal terminal, which ensures that a metal terminal manufactured by the manufacturing method is bonded to an external electrode.

In order to solve the problems mentioned above, an electroconductive paste for bonding a metal terminal to an electrode, contains:

as an inorganic filler, a spherical Cu powder of 3 µm or less in average particle size;

a flat Cu powder of 3 or more in aspect ratio and 10 µm or more in average particle size;

glass frit; and a spherical inorganic powder of 30 µm or more in average particle size, the spherical inorganic powder including an inorganic material that is not melted in a heat treatment step for baking.

It is to be noted that the particle sizes (average particle sizes) of the spherical Cu powder, flat Cu powder, and spherical inorganic powder are all average particle sizes (D50) in Microtrack (laser diffraction-scattering type) measurement for each powder.

In addition, the term "spherical" in the case of the spherical Cu powder or spherical inorganic powder is not intended to mean a strictly spherical shape, but intended to mean a more spherical shape unlike a flat shape, a rod shape, a flake shape, an amorphous shape, etc.

The electroconductive paste for bonding a metal terminal according to the present invention preferably contains the spherical inorganic powder in a proportion of 10 to 35 parts by volume with respect to 100 parts by volume of a mixture of the spherical Cu powder and the flat Cu powder.

In addition, the spherical inorganic powder preferably includes a ceramic material.

In addition, the proportion of the flat Cu powder to the total amount of the spherical Cu powder and the flat Cu powder preferably falls within the range of 10 to 50% by volume.

Furthermore, a method for manufacturing an electronic component with a metal terminal, the electronic component being structured to have a metal terminal bonded to an external electrode provided on an electronic component element, the method including:

interposing the electroconductive paste for bonding a metal terminal according to the present invention between the external electrode on the electronic component element and the metal terminal, and carrying out heat treatment to bake the electroconductive paste for bonding a metal terminal, thereby bonding the metal terminal to the external electrode through a baked electrode formed by baking the electroconductive paste for bonding a metal terminal.

In addition, an electronic component with a metal terminal according to the present invention is manufactured by the method for manufacturing an electronic component with a metal terminal according to the present invention.

The electroconductive paste for bonding a metal terminal according to the present invention contains, as the inorganic filler, the spherical Cu powder of 3 µm or less in average particle size, the flat Cu powder of 3 or more in aspect ratio and 10 µm or more in average particle size, the glass frit, and the spherical inorganic powder of 30 µm or more in average particle size, which is not melted in a heat treatment step for baking, and thus can ensure that a metal terminal is bonded to an external electrode or the like provided on an electronic component element.

More specifically, the electroconductive paste for bonding a metal terminal according to the present invention contains the spherical inorganic powder of 30 µm or more in average particle size, thus making it possible to ensure that the electron conductive paste in an amount required for achieving reliable bonding is held between a metal terminal and an external electrode while the spherical inorganic powder functions as a spacer, for example, when the metal terminal is bonded to the external electrode provided on an electronic component element. Further, as a result, a sufficient amount of baked electrode (bonding electrode) formed between the metal terminal and the external electrode by firing (baking) the electroconductive paste makes it possible to strongly bond the metal terminal and the external electrode.

In addition, a sufficient amount of baked electrode (bonding electrode) can be ensured between the metal terminal and the external electrode, and the baked electrode contains the spherical inorganic powder. Thus, it becomes possible for the sufficient amount of baked electrode (bonding electrode) to absorb the difference in linear coefficient of expansion between the electronic component element (for example, ceramic body) and the metal terminal to suppress or prevent crack generation in the baked electrode (bonding electrode) itself or the electronic component element (e.g., the ceramic body) in a thermal shock on products.

It is to be noted that it is possible to use the electroconductive paste for bonding a metal terminal according to the present invention, not only when a metal terminal is bonded to an external electrode provided on an electronic component element, but also, for example, when a metal terminal is bonded to an electrode formed on a substrate or the like.

In addition, the method for manufacturing an electronic component with a metal terminal according to the present invention includes the step of interposing the electroconductive paste for bonding a metal terminal according to the present invention between the external electrode on the electronic component element and the metal terminal, and carrying out heat treatment to bake the electroconductive paste for bonding a metal terminal, thereby bonding the metal terminal to the external electrode through a baked electrode (bonding electrode) formed by baking the electroconductive paste for bonding a metal terminal. Thus, the method can ensure that a highly reliable electronic component with a metal terminal is manufactured which has the metal terminal strongly bonded to the external electrode through the baked electrode (bonding electrode).

In addition, the electronic component with a metal terminal according to the present invention is manufactured by the manufacturing method described above, and the method can provide a highly reliable electronic component with a metal terminal, which has a metal terminal strongly bonded to an external electrode.

DETAILED DESCRIPTION OF THE INVENTION

The features of the present invention will be described in more detail with reference of embodiments of the present invention below.

The electroconductive paste according to the present invention is an electroconductive paste for bonding a metal terminal to an electrode, such as an external electrode provided on an electronic component element, the electroconductive paste containing: as an inorganic filler, (a) a spherical Cu powder of 3 μm or less in average particle size;

(b) a flat Cu powder of 3 or more in aspect ratio and 10 μm or more in average particle size;

(c) glass frit; and (d) a spherical inorganic powder of 30 μm or more in average particle size, which is composed of an inorganic material that is not melted in a heat treatment step for baking.

For connecting the metal terminal to the external electrode provided on the electronic component element, heat treatment at a low temperature of 700° C. or lower is desired in order to prevent the external electrode from being sintered or the metal terminal from being rusted.

Thus, in the electroconductive paste for bonding a metal terminal according to the present invention, fine spherical Cu powder of 3 μm or less in average particle size (for example, submicrons of 1 micron or less to 3 μm) is used for the main part of the Cu powder, in order to allow for the heat treatment at a low temperature of 700° C. or lower.

It is to be noted that the average particle size of the spherical Cu powder in excess of 3 μm unfavorably makes it difficult to achieve the heat treatment at a low temperature of 700° C. or lower.

In addition, in the electroconductive paste for bonding a metal terminal according to the present invention, it is preferable to use low-softening-point glass as the glass frit for promoting low-temperature sintering. For example, it is desirable to use, for example, borosilicate glass frit which is fine with an average particle size of 3 μm.

However, in the case of just using this fine borosilicate glass frit, when the metal terminal is pressed against the external electrode after the electroconductive paste for bonding a metal terminal is printed on the external electrode, the electroconductive paste for bonding a metal terminal is extruded from the gap between the external electrode and the metal terminal to the outside region, and insufficiently left between the external electrode and the metal terminal, resulting in an insufficient fixing strength of the metal terminal to the external electrode.

In contrast, in the case of the electroconductive paste for bonding a metal terminal according to the present invention, in order to allow for a sufficient bonding strength of the metal terminal to the external electrode, the addition of the spherical inorganic powder composed of an inorganic material of 30 μm or more in average particle size, which is not melted at the temperature for the heat treatment step (baking step), provides a gap of 30 μm or more between the metal terminal and the external electrode, and the gap filled with the paste is held so that a desired fixing force is achieved.

It is to be noted that the average particle size of the spherical inorganic powder less than 30 μm is not preferable because it becomes difficult to sufficiently hold the electroconductive paste for bonding a metal terminal between the external electrode and the metal terminal.

Further, it is desirable to use the spherical inorganic powder less than 100 μm in average particle size, because the excessively increased particle size of the spherical inorganic powder also has adverse effects such as failure to achieve a sufficient bonding strength, due to the excessively expanded gap between the external electrode and the metal terminal.

In addition, when the inorganic filler is composed of only a Cu powder and glass frit (when the inorganic powder is not added), the ability is lost to sufficiently ensure the amount of electroconductive paste that exists between the metal terminal and the external electrode, the difference in linear coefficient of expansion between the base material (ceramic body) with the external electrode formed thereon and the metal terminal is thus not able to be sufficiently absorbed by a baked electrode (bonding electrode), and the baked electrode (bonding electrode) itself, the ceramic body, etc. may be cracked in some cases in a thermal shock test on products. However, the electroconductive paste for bonding a metal terminal according to the present invention has the blended spherical inorganic powder of 30 μm or more in average particle size, thus making it possible to sufficiently ensure the electroconductive paste between the metal terminal and the external electrode, and the difference in linear coefficient of expansion between the electronic component element (for example, ceramic body) and the metal terminal can be absorbed by a sufficient amount of baked electrode (bonding electrode) to suppress or prevent crack generation in the baked electrode (bonding electrode) itself or the electronic component element (e.g., the ceramic body).

Moreover, even when a sufficient fixing force is achieved by blending the spherical inorganic powder, large voids may be generated between the opposed surfaces of the metal terminal and external electrode in some cases when the electroconductive paste for bonding a metal terminal is dried. In this regard, when the electroconductive paste for bonding a metal terminal is dried, the solvent included in the electroconductive paste for bonding a metal terminal evaporates to cause the electroconductive paste for bonding a metal terminal to flow, and accordingly, the inorganic filler moves to a region covered with no metal terminal to generate voids in the region with the inorganic filler reduced, which is covered with the metal terminal.

Therefore, in the electroconductive paste for bonding a metal terminal according to the present invention, in order to suppress the generation of cracks and voids as mentioned above, the addition of the flat Cu powder of 3 or more in aspect ratio and 10 μm or more in average particle size into the paste suppresses the physical flow of the inorganic filler to suppress the generation of large voids, when the electroconductive paste is dried.

It is to be noted that the average particle size of the flat Cu powder less than 10 μm is not preferable because the effect of suppressing the physical flow of the inorganic filler becomes insufficient.

In addition, the aspect ratio of the flat Cu powder less than 3 is not preferable because the effect of suppressing the physical flow of the inorganic filler also becomes insufficient.

In addition, the electroconductive paste for bonding a metal terminal according to the present invention preferably contains the spherical inorganic powder in a proportion of 10 to 35 parts by volume with respect to 100 parts by volume of the mixture of the spherical Cu powder and the flat Cu powder, and this is due to the fact that the proportion of the spherical inorganic powder below 10 parts by volume results in failure to achieve a desired fixing force, and further also degrades thermal shock resistance, whereas the proportion in excess of 35 parts by volume decreases the fixing force.

Furthermore, it is desirable to use, as the spherical inorganic powder, a powder of ceramic material such as $ZrO_2$, $Al_2O_3$, $TiO_2$, SiN, or SiC.

This is because the ceramic material is excellent in thermal, chemical, and physical stability; can reduce the difference in linear coefficient of expansion between a baked electrode (bonding electrode) formed by baking the electroconductive paste for bonding a metal terminal and the electronic component element (for example, a ceramic body); and the like.

Example

With reference to an example of the present invention below, the features of the present invention will be further specifically described.

Embodiment 1

Figure 1:
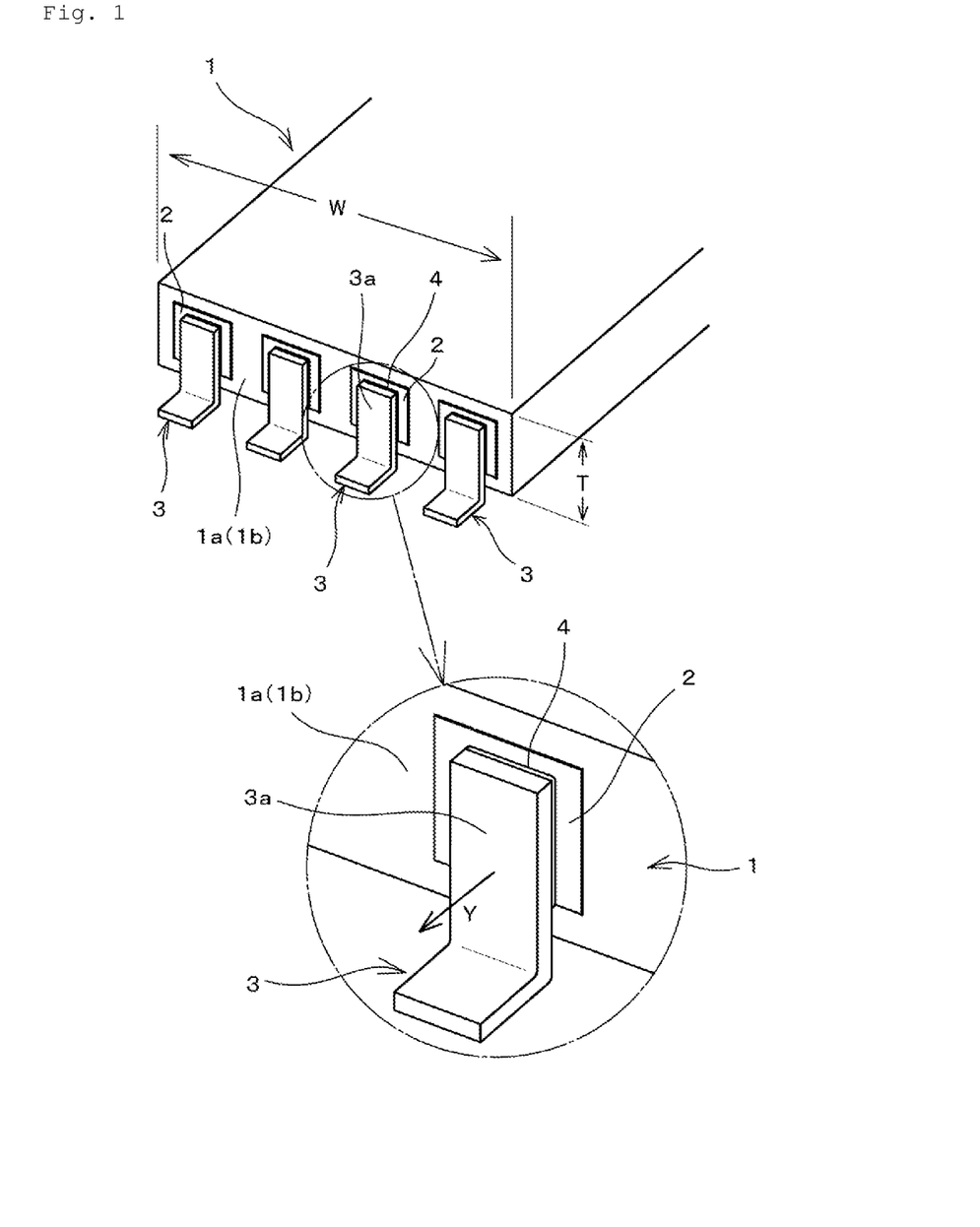
FIG. 1 is a perspective view illustrating the configuration of a main section of an electronic component with a metal terminal according to an example of the present invention (a laminated ceramic capacitor with a metal terminal in this example).
Figure 2:
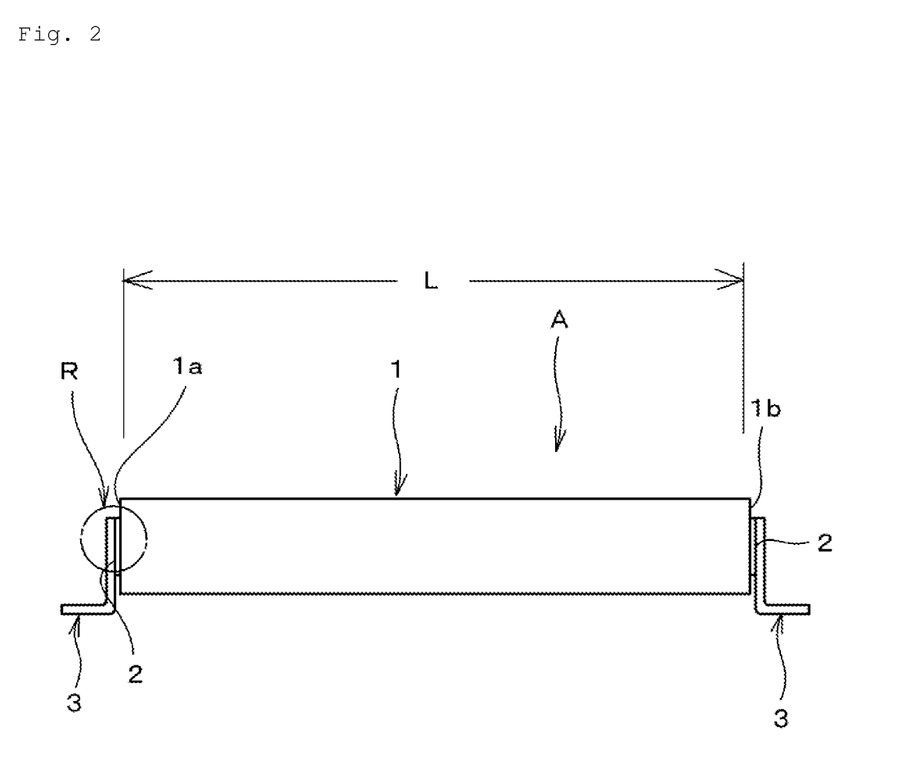
FIG. 2 is a front view of the electronic component with the metal terminal according to the example of the present invention (the laminated ceramic capacitor with the metal terminal).
Figure 3:
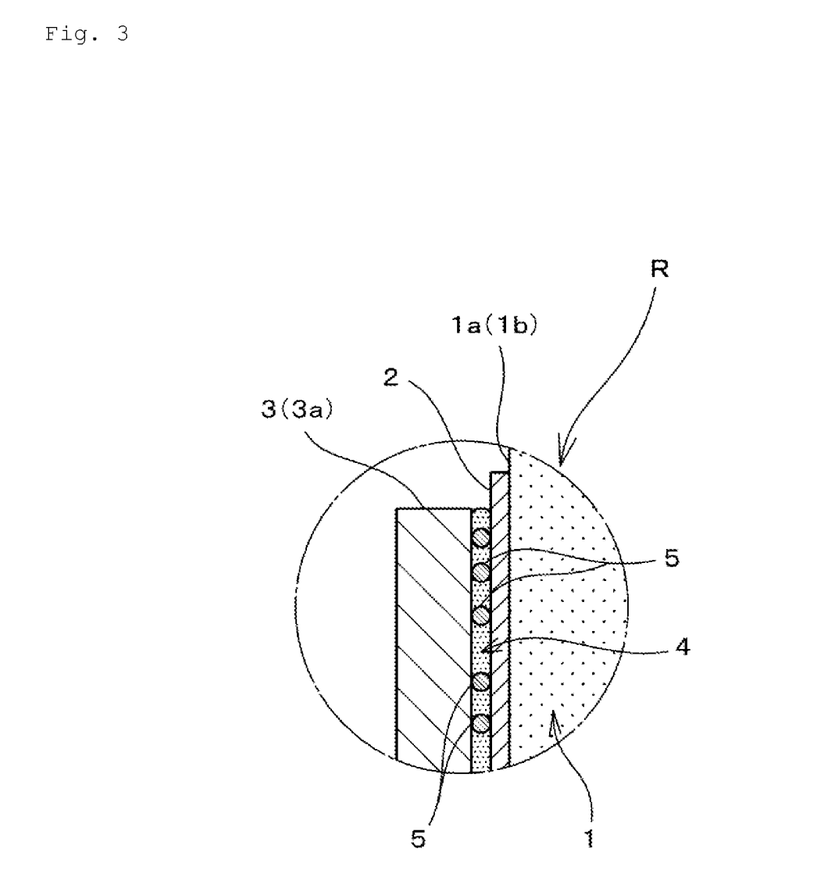
FIG. 3 is a cross-sectional view schematically illustrating, as a cross section, a region R in FIG. 2.

FIG. 1 is a perspective view illustrating the configuration of a main section of an electronic component with a metal terminal according to an example of the present invention (a laminated ceramic capacitor with a metal terminal in this example), FIG. 2 is a front view of the component, and FIG. 3 is a cross-sectional view schematically illustrating, as a cross section, a region R in FIG. 2.

This electronic component A with the metal terminal is an arrayed laminated ceramic capacitor fitted with four capacitor elements in parallel, and end surfaces 1a, 1b of a laminated ceramic capacitor body (electronic component element) 1 fitted with a plurality of capacitor elements are each provided with a plurality of (four in this example) external electrodes 2.

Further, the electronic component A with the metal terminal has metal terminals 3 bonded and fixed to the respective external electrodes 2 of the electronic component element 1 through baked electrodes (bonding electrodes) 4 formed by baking the electroconductive paste.

More specifically, in FIGS. 1 to 3, vertical sections 3a of the metal terminals 3 opposed to the external electrodes 2 are bonded to the external electrodes 2 through the baked electrodes (bonding electrodes) 4 containing a spherical inorganic powder 5.

It is to be noted that the external electrodes 2 are Cu electrodes provided on the end surfaces 1a, 1b of the electronic component element 1.

In addition, the bonding electrodes (baked electrodes) 4 are Cu baked electrodes obtained by baking a Cu paste.

It is to be noted that the laminated ceramic capacitor body (electronic component element) 1 constituting the electronic component A with the metal terminal has dimensions of 3 cm in width; 4 cm in length; and 0.4 cm in thickness.

In addition, the respective external electrodes 2 are each 40 mm in width and 4 mm in height.

Furthermore, the electroconductive paste (Cu paste) for bonding a metal terminal according to the present invention is used as a material (electroconductive paste) for forming the baked electrodes (bonding electrodes) 4 for bonding the metal terminals 3 to the external electrodes 2.

<Preparation of Sample>

In this example, as the electroconductive paste (Cu paste) for bonding a metal terminal, a paste was used which was obtained in such a way that an inorganic filler containing:

(a) a spherical Cu powder of 3 μm in average particle size;
(b) a flat Cu powder of 3 in aspect ratio and 10 μm in average particle size;
(c) glass frit of 3 μm in average particle size; and
(d) a spherical inorganic powder composed of $ZrO_2$ of 30 μm in average particle size as an unmelted inorganic material in a heat treatment step for baking was kneaded and dispersed with a three-roll mill in a varnish dissolved in a solvent (terpineol) in such a proportion as 15% by weight of acrylic resin.

In addition, the proportion of the spherical inorganic powder (spherical $ZrO_2$ powder) was adjusted so that the proportion of the spherical inorganic powder (spherical $ZrO_2$ powder) was 10 to 35 parts by volume with respect to 100 parts by volume of the mixture of the spherical Cu powder and the flat Cu powder.

In addition, the proportions of the spherical Cu powder and the flat Cu powder were adjusted so that the proportion of the flat Cu powder to the total amount of the spherical Cu powder and the flat Cu powder fell within the range of 10 to 50% by volume.

Then, the electroconductive paste (Cu paste) for bonding a metal terminal, which was prepared in the way described above, was printed with the use of a metal mask onto the surfaces of the external electrodes 2 formed on the end surfaces 1a, 1b of the laminated ceramic capacitor body (electronic component element) 1.

Next, onto the printed electroconductive paste (Cu paste) for bonding a metal terminal, metal terminals pressed at a constant pressure for fixation with the use of a push jig were directly dried under the conditions of 150° C. for 10 minutes in an oven.

Then, while the metal terminals were fixed with the jig, a continuous belt furnace was used to carry out heat treatment under the condition of keeping at a maximum temperature of 620 to 720° C. for 15 minutes in a $N_2$ atmosphere (oxygen concentration: 50 ppm or less) for baking the electroconductive paste (Cu paste) for bonding a metal terminal, thereby bonding the metal terminals 3 to the external electrodes 2 formed on the end surfaces 1a, 1b of the laminated ceramic capacitor body (electronic component element) 1 through the baked electrodes (bonding electrodes) 4.

In this example, the baked electrodes (bonding electrodes) 4 after being fired were adapted to be about 100 μm in film thickness at thin points. Accordingly, the electronic component (sample) A with the metal terminals was obtained which was structured as shown in FIGS. 1 to 3.

It is to be noted that FIG. 3 is a view schematically illustrating the configuration of the electronic component A with the metal terminals in order to facilitate understanding of the invention, and the particle sizes of the spherical inorganic powders 5, the thicknesses of the baked electrodes (bonding electrodes) 4, etc. are not considered as accurate enlargement or reduction of actual dimensions.

<Evaluation of Characteristics>

The magnitude of the fixing force of the metal terminal, the void generation in the baked electrode (bonding electrode) located between the metal terminal and the external electrode, and the thermal shock resistance were examined for each electronic component (sample) with metal terminals, prepared while varying:

(1) the proportion of the spherical inorganic powder (spherical $ZrO_2$ powder) added; and
(2) the proportions of the spherical Cu powder and the flat Cu powder as described above. The results are shown in Table 1.

TABLE 1

| Sample Number | Proportion of $ZrO_2$ Powder (parts by volume) | Proportion of Flat Cu Powder (% by volume) | Fixing Force (N) | Fixing Force Evaluation | Void Generation | Thermal Shock Resistance |
|---|---|---|---|---|---|---|
| 1* | 0 | 0 | 2 | X | X | X |
| 2 | 5 | 30 | 6 | ◯ | ⊙ | ◯ |
| 3 | 10 | 30 | 10 | ⊙ | ⊙ | ◯ |
| 4 | 20 | 30 | 13 | ⊙ | ⊙ | ◯ |
| 5 | 30 | 30 | 11 | ⊙ | ⊙ | ◯ |

TABLE 1-continued

| Sample Number | Proportion of ZrO$_2$ Powder (parts by volume) | Proportion of Flat Cu Powder (% by volume) | Fixing Force (N) | Fixing Force Evaluation | Void Generation | Thermal Shock Resistance |
|---|---|---|---|---|---|---|
| 6 | 35 | 30 | 10 | ◉ | ◉ | ○ |
| 7 | 40 | 30 | 8 | ○ | ◉ | ○ |
| 8 | 20 | 5 | 15 | ◉ | ○ | ○ |
| 9 | 20 | 10 | 15 | ◉ | ◉ | ○ |
| 10 | 20 | 20 | 14 | ◉ | ◉ | ○ |
| 11 | 20 | 40 | 11 | ◉ | ◉ | ○ |
| 12 | 20 | 50 | 10 | ◉ | ◉ | ○ |
| 13 | 20 | 60 | 7 | ○ | ◉ | ○ |
| 14 | 10 | 10 | 14 | ◉ | ◉ | ○ |
| 15 | 35 | 10 | 10 | ◉ | ◉ | ○ |
| 16 | 10 | 50 | 11 | ◉ | ◉ | ○ |
| 17 | 35 | 50 | 10 | ◉ | ◉ | ○ |

It is to be noted that the proportion of the spherical ZrO$_2$ powder in Table 1 refers to the value of the spherical ZrO$_2$ powder (spherical inorganic powder) in terms of parts by volume with respect to 100 parts by volume of the mixture of the spherical Cu powder and the flat Cu powder.

In addition, the proportion of the flat Cu powder in Table 1 refers to the proportion (% by volume) of the flat Cu powder with respect to the total amount of the spherical Cu powder and the flat Cu powder.

It is to be noted that the fixing force of the metal terminal as shown in Table 1 refers to the value of the maximum stress applied until the metal terminal comes off when the metal terminal is pulled at a constant rate in the direction of detaching the metal terminal from the electronic component element (the direction of an arrow Y in FIG. 1). In the case of the electronic components with the metal terminals according to this example, the fixing force less than 5 N, the fixing force of 5 N or more and less than 10 N, and the fixing force of 10 N or more were respectively regarded as defective (x), good (○), and excellent (◉) in consideration of product characteristics.

On the other hand, the void generation refers to the result of visually observing the region (bonding part) between the metal terminal and the external electrode from the outside of the product, and observing the region with the metal terminal peeled. Then, the generation was ranked according to the sizes of voids, and regarded as (◉) when there was no void recognized, as good (○) when the area of voids was less than ⅓ of the area of contact between the metal terminal and the baked electrode (bonding electrode), or as defective (X) when the area of voids was ⅓ or more of the area of contact between the metal terminal and the baked electrode (bonding electrode). It is to be noted that the sample regarded as X for the void generation refers to a sample which has concerns about adverse effects on the fixing force of the metal terminal or the reliability of the product.

Furthermore, the thermal shock test shows the results of implementing 1000 cycles of cooling and heating in the range of −55 to 125° C., and then observing whether the baked electrode (bonding electrode) is cracked or not, and the results were regarded as good (○) when no crack was recognized, or as defective (x) when crack generation was recognized.

In Table 1, the sample of sample number 1 is a sample (comparative example) that fails to meet the requirements of the present invention, which contains no spherical inorganic powder (spherical ZrO$_2$ powder) or flat Cu powder, whereas the other samples are samples according to the example of the present invention.

The results shown in Table 1 will be described below.

In the case of the sample of sample number 1 (without the addition of the spherical ZrO$_2$ powder) in which the additive amount of the spherical inorganic powder (spherical ZrO$_2$ powder) is less than 10 parts by volume with respect to 100 parts by volume of the mixture of the spherical Cu powder and the flat Cu powder, the low fixing force of 2 N resulted in failure to achieve a sufficient fixing force (bonding strength).

This is due to the fact that in the case of containing no spherical inorganic powder (spherical ZrO$_2$ powder), the electroconductive paste (Cu paste) for bonding a metal terminal, which is located between the metal terminal and the external electrode, is extruded from the region covered with the metal terminal to the outside, thus resulting in failure to achieve a sufficient fixing force from the baked electrode (bonding electrode).

In addition, in the case of the sample of sample number 1 without any spherical inorganic powder (spherical ZrO$_2$ powder) added thereto, the defect of the baked electrode (bonding electrode) cracked was generated.

This crack is generated due to the increased difference in linear coefficient of expansion between the electronic component element and metal terminal, and the baked electrode (bonding electrode).

In addition, in the case of the sample of sample number 2 in which the proportion of the spherical inorganic powder (spherical ZrO$_2$ powder) is less than 10 parts by volume (5 parts by volume) with respect to 100 parts by volume of the mixture of the spherical Cu powder and the flat Cu powder, it was confirmed that the fixing force of 6 N is somewhat low while succeeding in achieving tentatively practicable characteristics.

In addition, in the case of the sample (the sample of sample number 7) in which the amount of the spherical inorganic powder (spherical ZrO$_2$ powder) added is 40 parts by volume, which is a proportion in excess of 35 parts by volume with respect to 100 parts by volume of the mixture of the spherical Cu powder and the flat Cu powder, it was confirmed that the fixing force of 8 N is somewhat low while succeeding in achieving tentatively practicable characteristics.

In addition, in the case of the sample of sample number 1 in which the proportion of the flat Cu powder is 0% by volume with respect to the total amount of the spherical Cu powder and the flat Cu powder (also without the addition of the spherical inorganic powder), both the fixing force and thermal shock resistance showed unfavorable results, with voids generated in the region (bonding part) between the metal terminal and the external electrode.

In addition, the sample of sample number 8 in which the proportion of the flat Cu powder is less than 10% by volume with respect to the total amount of the spherical Cu powder and the flat Cu powder (flat Cu powder=5% by volume) also had some voids generated in the region (bonding part) between the metal terminal and the external electrode.

This is due to the fact that in the case of the low proportion of the flat Cu powder, when the electroconductive paste (Cu paste) for bonding a metal terminal is dried, the inorganic filler is more likely to flow to lower the concentration of the inorganic filler in the finally dried region covered with the metal terminal.

In addition, also in the case of the sample of sample number 13 in which the proportion of the flat Cu powder is more than 50% by volume with respect to the total amount of the spherical Cu powder and the flat Cu powder (flat Cu powder: 60% by volume), it was confirmed that the fixing force (bonding strength) of 7 N is somewhat low while succeeding in achieving tentatively practicable characteristics.

In contrast, in the case of the samples in which the proportion of the spherical inorganic powder (spherical $ZrO_2$ powder) falls within the range of 10 to 35 parts by volume with respect to 100 parts by volume of the mixture of the spherical Cu powder and the flat Cu powder, and the proportion of the flat Cu powder falls within the range of 10 to 50% by volume with respect to the total amount of the spherical Cu powder and the flat Cu powder, that is, in the case of the samples of sample numbers 3 to 6, sample numbers 9 to 12, and sample numbers 14 to 17, it was confirmed that highly reliable electronic components with metal terminals strongly bonded to external electrodes are achieved in which the fixing force of the metal terminal is 10 N or more without any void generation or crack generation recognized.

Therefore, the proportion of the spherical inorganic powder (spherical $ZrO_2$ powder) is desirably a proportion of 10 to 35 parts by volume with respect to 100 parts by volume of the mixture of the spherical Cu powder and the flat Cu powder.

In addition, the proportion of the flat Cu powder desirably falls within the range of 10 to 50% by volume with respect to the total amount of the spherical Cu powder and the flat Cu powder.

It is to be noted that while the spherical Cu powder of 3 μm in average particle size is used in this example, the ability will be lost to achieve any sufficient fixing force because of insufficiently sintered baked electrodes (bonding electrodes) formed by baking the electroconductive paste for bonding a metal terminal, when a spherical Cu powder in excess of 3 μm in average particle size is used as the spherical Cu powder.

Further, while the flat Cu powder of 10 μm in average particle size is used in this example, the effect of preventing the inorganic filler from flowing will unfavorably become insufficient to generate voids in baked electrodes (bonding electrodes) formed between metal terminals and external electrodes in a drying step or the like for the electroconductive paste (Cu paste) for bonding a metal terminal, when a flat Cu powder less than 10 μm in average particle size is used as the flat Cu powder.

Further, when a flat Cu powder less than 3 in aspect ratio is used as the flat Cu powder, the flat Cu powder will be unfavorably more spherical in shape and more likely to flow, thus also making voids more likely to be generated in baked electrodes (bonding electrodes) formed between metal terminals and external electrodes.

Further, while the spherical $ZrO_2$ powder of 30 μm in average particle size is used as the spherical inorganic powder in this example, the effect of ensuring the space for holding the sufficient amount of the electroconductive paste (Cu paste) for bonding a metal terminal between metal terminals and external electrodes will unfavorably become insufficient to decrease the amount of the space-filling electroconductive paste (Cu paste) for bonding a metal terminal, and lose the ability to achieve any desirable fixing force, when a powder less than 30 μm in average particle size is used as the spherical inorganic powder.

It is to be noted while a case of bonding the metal terminal to the external electrode provided on the electronic component element with the plurality of capacitor elements provided in parallel (in an array) has been described by way of example in the example described above, it is also possible to apply the present invention in the case of bonding a metal terminal to an external electrode of a laminated ceramic capacitor including a single capacitor element without having any array structure.

In addition, while a case of the substantially L-shaped metal terminal obtained by bending a rectangular plate-like member to a substantially right angle has been described by way of example in the example described above, the present invention is not particularly limited by the shape of the metal terminal, but it is possible to widely apply the present invention in the case of bonding metal terminals in various shapes to external electrodes.

The present invention is not further limited to the embodiment described above even in other respects, it is possible to make various applications and modifications within the scope of the invention, also regarding a method for manufacturing the electronic component with the metal terminals and specific conditions in the manufacturing steps.

DESCRIPTION OF REFERENCE SYMBOLS 1 laminated ceramic capacitor body (electronic component element)
1a, 1b end surface of electronic component element
2 external electrode
3 metal terminal
3a vertical section of metal terminal
4 bonding electrode (baked electrode)
5 spherical inorganic powder (spherical $ZrO_2$ powder)

The invention claimed is:

1. An electroconductive paste comprising:
 a spherical Cu powder of 3 μm or less in average particle size;
 a flat Cu powder of 3 or more in aspect ratio and 10 μm or more in average particle size;
 glass frit; and
 a spherical inorganic powder of 30 μm or more in average particle size, the spherical inorganic powder including an inorganic material that is not melted in a heat treatment when the electroconductive paste is baked.

2. The electroconductive paste according to claim 1, wherein the spherical inorganic powder is in a proportion of 10 to 35 parts by volume with respect to 100 parts by volume of a mixture of the spherical Cu powder and the flat Cu powder.

3. The electroconductive paste according to claim 1, wherein the spherical inorganic powder includes a ceramic material.

4. The electroconductive paste according to claim 3, wherein the ceramic material is selected from the group consisting of $ZrO_2$, $Al_2O_3$, $TiO_2$, SiN and SiC.

5. The electroconductive paste according to claim 1, wherein a proportion of the flat Cu powder to a total amount of the spherical Cu powder and the flat Cu powder falls within a range of 10 to 50% by volume.

6. The electroconductive paste according to claim 1, wherein the glass frit is borosilicate glass frit having an average particle size of 3 μm.

7. The electroconductive paste according to claim 1, wherein the inorganic material does not melt at a temperature of 700° C. or lower.

8. The electroconductive paste according to claim 1, wherein the spherical inorganic powder is 30 μm or more and 100 μm or less in average particle size.

9. A method for manufacturing an electronic component, the electronic component having a metal terminal bonded to an external electrode provided on an electronic component element, the method comprising:
 interposing the electroconductive paste according to claim 1 between the external electrode on the electronic component element and the metal terminal; and
 baking the electroconductive paste so as to bond the metal terminal to the external electrode.

10. The method for manufacturing an electronic component according to claim 9, wherein the spherical inorganic powder is in a proportion of 10 to 35 parts by volume with respect to 100 parts by volume of a mixture of the spherical Cu powder and the flat Cu powder.

11. The method for manufacturing an electronic component according to claim 9, wherein the spherical inorganic powder includes a ceramic material.

12. The method for manufacturing an electronic component according to claim 11, wherein the ceramic material is selected from the group consisting of $ZrO_2$, $Al_2O_3$, $TiO_2$, SiN and SiC.

13. The method for manufacturing an electronic component according to claim 9, wherein a proportion of the flat Cu powder to a total amount of the spherical Cu powder and the flat Cu powder falls within a range of 10 to 50% by volume.

14. The method for manufacturing an electronic component according to claim 9, wherein the glass frit is borosilicate glass frit having an average particle size of 3 μm.

15. The method for manufacturing an electronic component according to claim 9, wherein the baking is conducted at a temperature of 700° C. or lower.

16. The method for manufacturing an electronic component according to claim 9, wherein the spherical inorganic powder is 30 μm or more and 100 μm or less in average particle size.

17. An electronic component with a metal terminal, which is manufactured by the method for manufacturing an electronic component according to claim 9.

* * * * *